Patented Nov. 23, 1926.

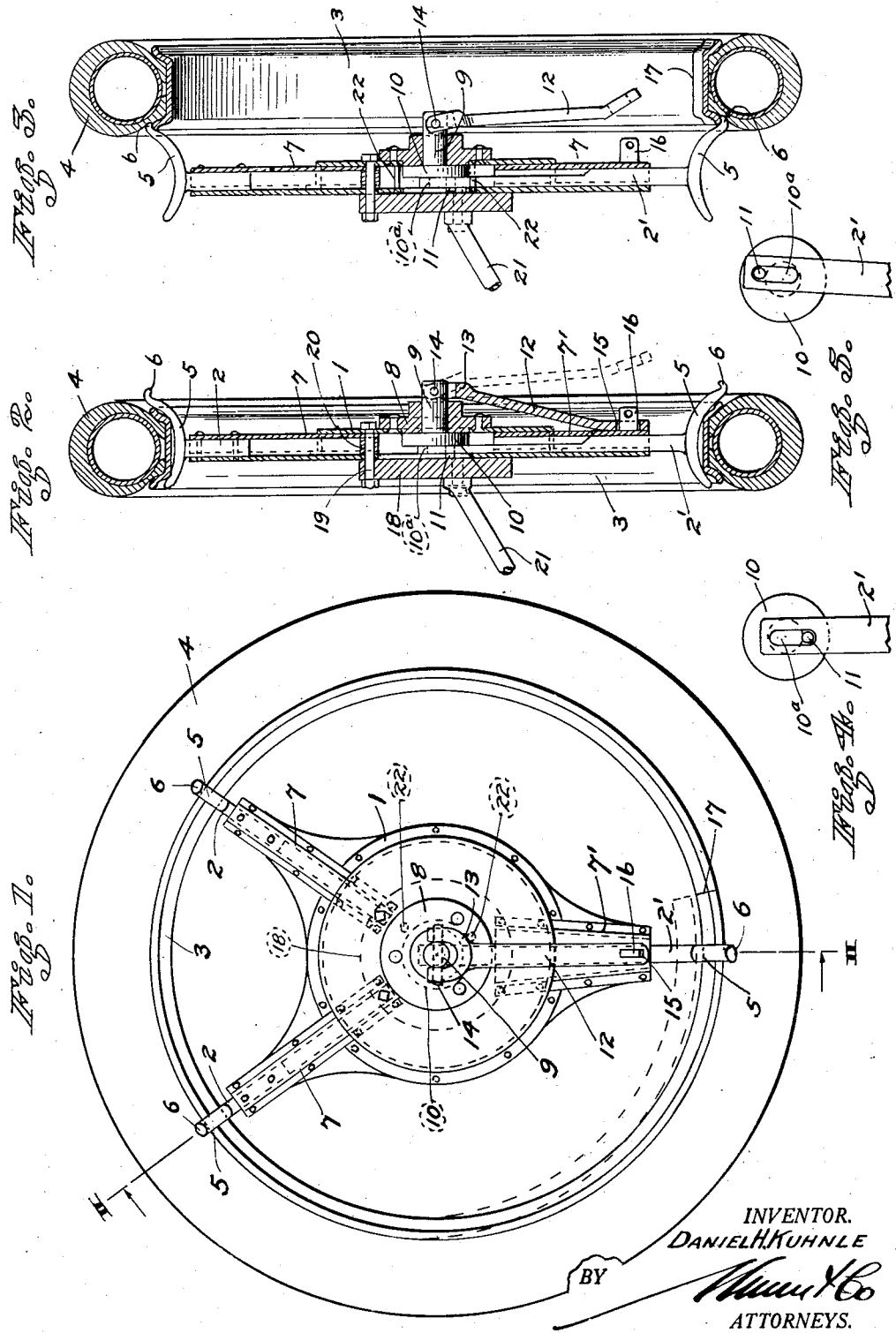

1,608,126

UNITED STATES PATENT OFFICE.

DANIEL H. KUHNLE, OF SAN FRANCISCO, CALIFORNIA.

TIRE CARRYING AND CHANGING RACK.

Application filed December 9, 1924. Serial No. 754,821.

This invention relates to spare tire or rim carrying racks as used on automobiles and it has for its principal objects such a rack which may be radially expanded within a tire and rim to snugly hold the same in place against removal or rattling, and also which may be powerfully contracted for removal of the rim or for contracting the same for removal of the tire from the rim.

The above objects together with others which will appear as the description proceeds are realized in the tire rack construction shown in the accompanying drawings, and in which:—

Figure 1 is a plan view of my rack with a tire and rim held firmly in place.

Figure 2 is a vertical section of Figure 1 taken along the line 2—2 thereof, and Figure 3 is a similar section illustrating the rack in the act of contracting a split rim for the removal of a tire therefrom.

Figures 4 and 5 are diagrammatic elevations of the actuating disc and its coacting rim engaging bar.

In detail the rack comprises a circular body or bracket housing 1 having three radial arms 2, 2 and 2' arranged thereon for engaging the inner diameter of a rim 3 upon which a tire 4 is mounted.

The arms have each a curved shoe 5 at their outer ends adapted to engage outwardly beyond both sides of the center of the rim so that when the arms are radially expanded the rim cannot be removed and each shoe is also provided with a hook 6 for contracting the rim as later described.

The two arms 2, 2 are each secured rigidly to the body 1 and reinforced by a channel 7 of sheet metal which embraces the arms and is riveted to the body, but the arm 2' is embraced by a wider channel 7' and is free to move radially thereunder as well as to oscillate at its inner end.

Attached to the center of the body is a hub 8 revolvably supporting a short shaft 9 having a crank disk 10 at its inner end with a crank pin 11 projecting therefrom.

The inner end of arm 2' is reduced in thickness to overlie the disk 10 and is provided with a slot 10ª through which the crank pin 11 projects said pin being located eccentrically so that upon turning the shaft the crank pin will cause the arm to move in and out substantially in a radial direction, tho the inner end of the arm will follow the circular movement of the crank pin. Means to turn the shaft 9 is provided in the form of a hand crank 12 having a hub 13 forked to loosely fit the outer end of the shaft and transversely pinned thereto at 14, while at the outer end the hand crank is slotted at 15 to form a hasp to fit over a staple 16 rigidly secured to the channel 7' and adapted to receive a padlock to hold the hand crank inoperative.

Owing to the loose fork of the hub 13, the crank may be oscillated on the shaft while retained by the pivot 14 so as to bring it from angular position engaged with the staple to the dotted position shown in Figure 2 so that it may be used as a lever to turn the shaft.

When the hasp handle is engaged with the staple the crank pin is at a point to carry the arm 2' to its furthest outward position for expanding and locking the rim immovably in place as shown in Figure 2 and also when in this position the three hooks are spread open far enough to easily go over the edge of the rim when the rim is presented to them in the position shown in full in Figure 3 and upon turning the shaft a half revolution the rim will be contracted to the dotted position so that the tire may easily be removed or placed on the rim, or in case of Figure 2 the tire and its rim may freely be slipped over the shoes of the arms.

When contracting the rim the split 17 of the rim is brought to either side of the movable arm 2' so that the end of the rim will be pulled inwardly to free the tire, and it should be observed that the two fixed arms are relatively close together at the opposite side of the rim so as to take the reactance, and also when carrying a tire to both properly support the rim from below.

The carrier may be secured to an automobile body or frame in various ways depending on the position in which it is placed and the manner shown in the drawings includes a disk 18 bolted against the channels 7 and 7' by bolts 19 preferably surrounded by pipe collars 20 and the disk 18 may be braced to the vehicle by suitable braces 21 engaged under the bolt heads as shown in Figure 2.

As stated, the arm 2' is provided with a slot 10ª in which the pin 11 of the disc 10 projects. This slot is of a length compared with the throw of the arm 2' that when the arm is extended to disengage the rim when changing the tire, the pin is positioned at the upper end of the slot 10ᵃ, as shown in Figure 5. At this time, it follows that the arm 2′ can be moved manually in an upward direction so that the shoe 5 can be fully released from the rim, the normal position of the arm being shown in Figure 4. In this normal position the pin 11 is at the low end of the slot 10ᵃ. In order to prevent the arm 2′ from being thrown over center when adjusting said arm, I provide stop pins 22 mounted on the plate 18 and arranged in the path of movement of said arm.

I claim:

1. In a combined tire carrier and changer, a bracket, a shaft rotatably supported in said bracket, a disc secured to said shaft, a pin eccentrically secured to said disc, a radially disposed arm slidably secured in said bracket, said arm having an elongated slot engaging said pin, whereby, when the pin is at one end of slot, said arm may function as a tire carrier and when it is at the other end of the slot, the arm may function as a tire remover, a second radial arm, said radial arms being adapted to exert outward pressure on a tire rim when said arms function as a tire carrier, and means on each of said arms adapted to exert opposing inward pressures on the rim when the arms function as a tire remover.

2. A combined tire carrier and changer, comprising a stationary bracket, a guiding channel fixedly secured to said bracket, a shaft rotatably supported in said bracket, a disc fixedly secured to said shaft and revolvably supported in said bracket, radially disposed arms secured to said bracket, one of said radially disposed arms being slidably disposed in said guiding channel and having a slot therein, curved shoes, each of said shoes being fixedly secured to one of said radial arms, hooks, each fixedly secured to said shoes and adapted to engage a tire rim, a pin eccentrically fastened to said disc and adapted to engage said slot in said arm, the relative position of the slot and the pin determining the distance between the shoe and the center of the bracket.

DANIEL H. KUHNLE.